(12) United States Patent
Kuramori et al.

(10) Patent No.: US 6,915,824 B2
(45) Date of Patent: Jul. 12, 2005

(54) TIRE/WHEEL ASSEMBLY AND RUN-FLAT SUPPORT MEMBER

(75) Inventors: Akira Kuramori, Hiratsuka (JP);
Atsushi Tanno, Hiratsuka (JP);
Masatoshi Kuwajima, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 31 days.

(21) Appl. No.: 10/615,240

(22) Filed: Jul. 9, 2003

(65) Prior Publication Data

US 2004/0011447 A1 Jan. 22, 2004

(30) Foreign Application Priority Data

Jul. 22, 2002 (JP) ........................................ 2002-212369

(51) Int. Cl.$^7$ ........................ B60C 17/04; B60C 17/06
(52) U.S. Cl. ........................ 152/156; 152/158; 152/520
(58) Field of Search ................................ 152/156, 158, 152/520, 248, 249

(56) References Cited

U.S. PATENT DOCUMENTS 6,463,974 B1 * 10/2002 Hellweg et al. ........ 152/520 X
6,463,976 B1 * 10/2002 Glinz et al. .................. 152/520
6,805,176 B2 * 10/2004 Kuramori et al. ........... 152/156

FOREIGN PATENT DOCUMENTS

| JP | 10-297226 A1 | 11/1998 |
| JP | 2001-163020 A1 | 6/2001 |
| JP | 2001-519279 A1 | 10/2001 |
| WO | WO-99/64260 A1 * | 12/1999 |

* cited by examiner

Primary Examiner—Adrienne C. Johnstone
(74) Attorney, Agent, or Firm—Rader, Fishman & Grauer PLLC

(57) ABSTRACT

Disclosed is a tire/wheel assembly in which a run-flat support member is disposed in a cavity of a pneumatic tire fitted to a rim. The run-flat support member includes a circular shell, in which an outer circumferential side thereof is a support surface and an inner circumferential side thereof is opened to have two leg portions, and left and right elastic rings which support the two leg portions on the rim. The elastic rings have different rigidities from each other so that the elastic ring receiving a larger load during run-flat traveling has a higher rigidity.

6 Claims, 1 Drawing Sheet

TIRE/WHEEL ASSEMBLY AND RUN-FLAT SUPPORT MEMBER

BACKGROUND OF THE INVENTION

The present invention relates to a tire/wheel assembly and a run-flat support member. More specifically, the present invention relates to a tire/wheel assembly and a run-flat support member used therefore, in which durability can be improved.

In response to demands in the market, there have been many technologies proposed to allow a vehicle to run urgently in the order of several hundreds of kilometers even when a pneumatic tire is punctured while the vehicle is running. Among these many proposals, those proposed in Japanese Patent Laid-Open Publication No. 10-297226 and Published Japanese Translation of a PCT Application No. 2001-519279 have enabled run-flat traveling by fitting a support member onto a rim inside a cavity of a pneumatic tire assembled to the rim and supporting the punctured tire using the support member.

The preceding run-flat support member includes a circular shell in which the outer circumferential side thereof is a support surface and an inner circumferential side thereof is opened so as to form two leg portions. Also, elastic rings are fitted to both leg portions of the circular shell, thus the run-flat support member is supported on the rim via the elastic ring. In this run-flat support member, a conventional wheel and rim can be used as they are without any special modifications. Therefore, the run-flat support member is advantageously adopted without causing confusions in the market.

However, considering the structure of this type of run-flat support member, the elastic rings are vulnerable to damage in comparison with the circular shell during run-flat traveling. Therefore, durability of the run-flat support member depends largely on durability of the elastic rings. Hence, in order to improve durability of the tire/wheel assembly to which the above run-flat support member is attached during run-flat traveling, an improvement of the elastic rings' durability is vital.

SUMMARY OF THE INVENTION

An object of the present invention is to provide a tire/wheel assembly and a run-flat support member in which durability thereof can be improved.

In order to achieve the above object, the present invention provides a tire/wheel assembly in which a run-flat support member is disposed in a cavity of a pneumatic tire fitted to a rim of a wheel, the run-flat support member including a circular shell, an outer circumferential side of which is a support surface and an inner circumferential side of which is opened to have two leg portions, and left and right elastic rings which support the two leg portions on the rim, wherein the elastic rings have different rigidities from each other so that the elastic ring receiving a larger load during run-flat traveling has a higher rigidity.

The present invention also provides a run-flat support member including a circular shell in which an outer circumferential side thereof is a support surface and an inner circumferential side thereof is opened to have two leg portions, and left and right elastic rings which support the two leg portions on a rim, wherein the elastic rings have different rigidities from each other so that the elastic ring receiving a larger load during run-flat traveling has a higher rigidity.

As mentioned above, since the elastic ring receiving larger load during run-flat traveling has a larger rigidity, durability of the tire/wheel assembly having the run-flat member can be improved during run-flat traveling.

DETAILED DESCRIPTION OF PREFERRED EMBODIMENTS

Figure 1:
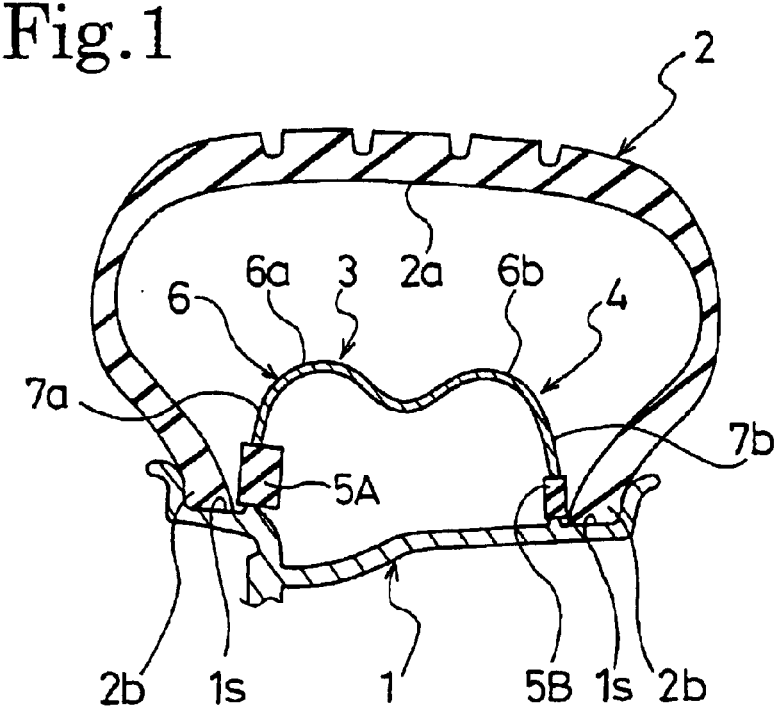
FIG. 1 is a cross-sectional view along a central meridian line showing a main part of a tire/wheel assembly according to an embodiment of the present invention.

In the present invention, the run-flat support member is formed as a circular member which is inserted in a cavity of a pneumatic tire. This run-flat support member is formed to have the outer diameter thereof smaller than an inner diameter of the cavity of the pneumatic tire in order to maintain a constant distance from the inner surface of the cavity. The inner diameter of the run-flat support member is formed to be approximately the same as an inner diameter of a bead of the pneumatic tire. The run-flat support member is inserted in the pneumatic tire, and assembled to a rim of a wheel together with the pneumatic tire, thus configuring the tire/wheel assembly. When the pneumatic tire is punctured while the vehicle with this tire/wheel assembly fitted thereto is running, the tire flattened out due to the puncture is supported on the outer circumferential surface of the run-flat support member, and thus run-flat traveling is enabled.

The foregoing run-flat support member is configured of the circular shell and elastic rings as main parts.

In the circular shell, the outer circumferential side thereof is formed as a continuous support surface for supporting a punctured tire, and the inner circumferential side thereof is opened to have two leg portions serving as bilateral sidewalls. The support surface on the outer circumferential side is formed to have a convexly curved surface toward the outer diameter side when viewed in the cross section profile orthogonal to a circumferential direction of the tire. The number of convexly curved surfaces aligned in an axial direction of the tire can be single, but preferably two or more. By forming the support surface in this way so as to align two or more convexly curved surfaces, contact of the support surface with the inner wall of the tire (inner wall facing the cavity) is dispersed amongst two or more points. Accordingly, localized wear on the inner wall of the tire can be reduced, making it possible to extend a distance that a vehicle can endure run-flat traveling.

The elastic rings are attached to both ends of the two leg portions formed in the inner diameter side of the circular shell, and are engaged with the rim seats located on both sides so as to support the circular shell. Since the elastic rings are made of rubber or elastic resin, the elastic rings not only mitigate vibrations of and impacts upon the circular shell from a punctured tire, but also prevent slipping in the rim seats, thereby stably supporting the circular shell.

Due to the fact that the run-flat support member has to support a vehicle weight through a punctured tire, the circular shell is made of a rigid material. For the constituent material of the circular shell, metal or resin, etc. can be used. As for metal, for example, steel or aluminum may be listed. The resin can be any of thermoplastic resin or thermosetting resin. Examples of the thermoplastic resin are nylon and polyester, etc. Examples of the thermosetting resin are epoxy resin and unsaturated polyester resin, etc. The resin can be used singly, but can also be used as fiber-reinforced resin blended with reinforcing fibers.

The elastic rings can be made any kind of rubber or elastic resin as long as the circular shell can be stably supported.

For example, natural rubber, isoprene rubber, styrene-butadiene rubber, butadiene rubber, and butyl rubber may be listed for a rubber material. For an elastic resin material, foamed resin such as foamed polyurethane can be listed.

The run-flat support member used for the tire/wheel assembly of the present invention is premised on the structure mentioned above.

The embodiments of the present invention will be described in detail below with reference to the drawings.

FIG. 1 is a cross-sectional view along a central meridian line showing a main part of the tire/wheel assembly according to an embodiment of the present invention.

The reference number 1 denotes a rim on the circumference of a wheel, the reference number 2 denotes a pneumatic tire, and the reference number 3 denotes a run-flat support member. The rim 1, pneumonic tire 2, and run-flat support member 3 are formed in a circular shape coaxially about the rotation axis of the wheel (not shown).

The run-flat support member 3 is configured of a circular shell 4 made of a rigid material such as metal or resin, and left and right elastic rings 5A and 5B made of an elastic material such as rubber or elastic resin.

In the illustrated cross section taken along a line in a shell width direction, the circular shell 4 is formed to have a curved support surface 6 with two convexly curved surfaces 6a and 6b having approximately the same radius of curvature in the outer circumferential side. The support surface 6 is spaced apart from the inner surface 2a of the pneumatic tire 2 when the pneumatic tire 2 is under a normal condition, whereas the support surface 6 supports the flattened tire when punctured. Further, the inner circumferential side of the circular shell 4 is opened to have two leg portions 7a and 7b, respectively serving as sidewalls on both sides. The elastic rings 5A and 5B are attached to the ends of the leg portions 7a and 7b on the inner circumferential side thereof.

The elastic rings 5A and 5B have different rigidities from one another, specifically, a higher rigidity is given to the elastic ring 5A that comes to an outer side of a vehicle when fitted to the vehicle compared to that of the elastic ring 5B on an inner side of the vehicle. This is because the outer side of the vehicle receives a larger load during run-flat traveling. Techniques of giving the elastic ring 5A a higher rigidity than that of the elastic ring 5B includes: increasing the thickness of the elastic ring 5A so as to become thicker than the elastic ring 5B; using an elastic material having a lower elasticity than that of the elastic ring 5B; and the combining the above two techniques; and the like.

The run-flat support member 3, in which the elastic rings 5A and 5B are formed in the above described way, is inserted into the pneumatic tire 2 to be assembled to a rim. Then, the elastic rings 5A and 5B are fitted to rim seats 1s and 1s of the rim 1 together with beads 2b and 2b of the pneumatic tire 2 simultaneously.

In the tire/wheel assembly during run-flat traveling, amongst loads applied to the elastic rings 5A and 5B of the run-flat support member 3, a load to the elastic ring 5A disposed on the outer side of the vehicle is generally larger. In the foregoing tire/wheel assembly of the present invention, however, it is possible to improve durability since the higher rigidity is given to the elastic ring 5A that comes to the outer side of the vehicle where the larger load is applied.

Exemplified in the embodiment of FIG. 1 is that the support surface 6 of the circular shell 4 has two convexly curved surfaces 6a and 6b. However, the number of the convexly curved surfaces is not limited to two, but one convexly curved surface or three or more can also be provided.

Figure 2:
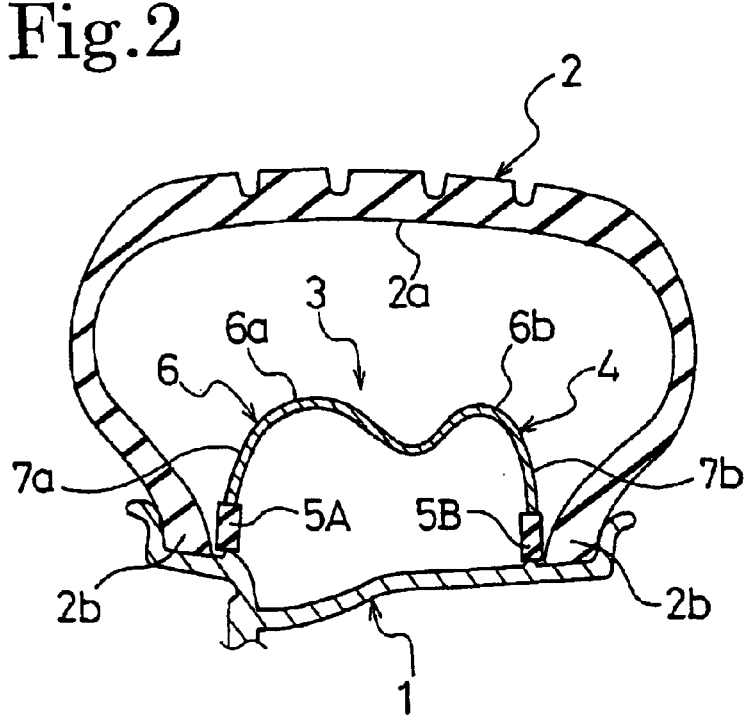
FIG. 2 is a cross-sectional view along a central meridian line showing a main part of a tire/wheel assembly according to another embodiment of the present invention.

FIG. 2 shows another example of a tire/wheel assembly of the present invention. In this embodiment, a support surface 6 of a circular shell 4 is configured to have two convexly curved surfaces 6a and 6b which have each different curvature radii.

In the tire/wheel assembly using this type of run-flat support member 3, a higher rigidity is given to an elastic ring 5B located on the side of the convexly curved surface 6b with a smaller radius of curvature, compared to that of an elastic ring 5A located on the side of the convexly curved surface 6a with a larger radius of curvature.

In the tire/wheel assembly in FIG. 2, amongst loads applied to the elastic rings 5A and 5B of the run-flat support member 3 during run-flat traveling, the higher load is applied to the elastic ring 5B located on the side of the convexly curved surface 6b with a smaller radius of curvature. Therefore, durability can be improved by giving a higher rigidity to the elastic ring 5B as mentioned above.

In the depicted example, it is described that the elastic rings 5A and 5B have the same thickness and an elastic material used for the elastic ring 5B has a higher elasticity than that used for the elastic ring 5A. However, similarly to the foregoing, it is also possible to make the rigidity of the elastic ring 5B higher than that of the elastic ring 5B by increasing the thickness of the elastic ring 5B so as to become thicker than the elastic ring 5A, by combining the above two techniques, or the like.

Exemplified in the embodiment of FIG. 2 is that the support surface 6 of the circular shell 4 has two convexly curved surfaces 6a and 6b. The number of the convexly curved surfaces, however, is three or more, and the circular shell 4 may be one including the support surface 6 having at least two convexly curved surfaces 6a and 6b.

In the present invention, in the case of giving a higher rigidity to the elastic ring which receives a larger load during run-flat traveling as described above, it is preferable that the rigidity of the elastic ring is higher by 10 to 100% than that of the other elastic ring. If the percentage is less than 10%, it is hard to effectively improve the durability. On the contrary, if the percentage exceeds 100%, a weight increase becomes significant when the thickness is increased. Therefore, in the case of using an elastic material having lower elasticity, the elastic ring becomes brittle. Consequently, there is a potential risk that the elastic ring can not endure deformation of itself when fitted to the rim.

Rigidity is the physical property of resisting flexure in an elastic ring radial direction. Rigidity of the elastic ring of the present invention is a value obtained in the following way: First, the circular shell is removed from the elastic ring. If the circular shell has the leg portion whose end in the inner circumferential side is embedded in the elastic ring, the leg portion is cut off to remove the circular shell so that the cut surface is flush with the outer circumferential surface of the elastic ring. Then, a 10 mm-long piece of the elastic ring is carved out along a ring circumferential direction. Subsequently, a load (2 kgf) W is applied to the carved out sample in an elastic ring radial direction at room temperature. That is, the sample is placed on a horizontal flat test plane, facing its surface of the inner circumferential side down. Then, a 2 kgf weight is put on the sample so as to contact to the entire upper surface of the sample, i.e., an outer circumferential surface of the elastic ring. While a load is applied to the sample, an amount of flexure $\delta$ (mm) in an elastic ring radial direction is measured, then the value is obtained from $W/\delta$.

EXAMPLE

Prepared were a tire/wheel assembly (example) of the present invention configured as shown in FIG. 1 and a conventional tire/wheel assembly (conventional example), both having the same tire size of 205/55R16 and rim size of 16×6 ½ JJ. In the tire/wheel assembly (example), an elastic ring on an outer side of a vehicle, when fitted to a vehicle, has a higher rigidity than that of another elastic ring on an inner side of the vehicle. The tire/wheel assembly (conventional example) was prepared in a way that an elastic ring on the outer side of the vehicle in the tire/wheel assembly of the present invention has the same rigidity as another elastic ring on the inner side of the vehicle.

The elastic rings of both test tire/wheel assemblies are made of rubber. The elastic ring on the outer side of the vehicle in the tire/wheel assembly of the present invention has a rigidity which is 30% higher than that of the elastic ring on the inner side of the vehicle.

By the use of the following measurement method, an evaluation test was conducted on durability of each of the test tire/wheel assemblies. The results shown in Table 1 were obtained.

Durability

Each of the test tire/wheel assemblies having 0 kPa of air pressure was fitted to a front right wheel of a front-wheel-drive vehicle with a displacement of 2.5 liters. Then, the vehicle was driven anti-clockwise on a circular track at 90 Km/h. A distance until the vehicle could no longer run was measured. The result of the measurement was represented by an index number, with the value of the conventional tire/wheel assembly being 100. The greater the index number is, the better the durability.

Incidentally, the wheels, other than the front right wheel of the front-wheel drive vehicle, had tires and rims in the same sizes mentioned earlier, with 200 kPa of air pressure.

TABLE 1

|  | Example | Conventional Example |
|---|---|---|
| Durability | 107 | 100 |

According to Table 1, it is understood that the tire/wheel assembly of the present invention is capable of improving durability.

As hitherto described, in the present invention, the left and right elastic rings have different rigidities from each other so that the elastic ring receiving a larger load during run-flat traveling has a higher rigidity. Thus, it is possible to improve durability.

What is claimed is:

1. A run-flat support member including a circular shell in which an outer circumferential side thereof is a support surface and an inner circumferential side thereof is opened to have two leg portions, and left and right elastic rings which support the two leg portions on a rim, wherein the elastic rings have different rigidities from each other so that the elastic ring receiving a larger load during run-flat traveling has a higher rigidity, and wherein the support surface of the circular shell has at least two convexly curved surfaces with different radius of curvatures from each other, and among the left and right elastic rings, a higher rigidity is given to the elastic ring located on a side of the convexly curved surface with a smaller radius of curvature.

2. A run-flat support member including a circular shell in which an outer circumferential side thereof is a support surface and an inner circumferential side thereof is opened to have two leg portions, and left and right elastic rings which support the two leg portions on a rim, wherein the elastic rings have different rigidities from each other so that the elastic ring receiving a larger load during run-flat traveling has a higher rigidity, and wherein the rigidity of the elastic ring having the higher rigidity is 10 to 100% higher than that of the other elastic ring.

3. A tire/wheel assembly in which a run-flat support member is disposed in a cavity of a pneumatic tire fitted to a rim of a wheel, the run-flat support member including a circular shell, an outer circumferential side of which is a support surface and an inner circumferential side of which is opened to have two leg portions, and left and right elastic rings which support the two leg portions on the rim, wherein the elastic rings have different rigidities from each other so that the elastic ring receiving a larger load during run-flat traveling has a higher rigidity, and wherein the support surface of the circular shell has at least two convexly curved surfaces with different radius of curvatures from each other, and among the left and right elastic rings, a higher rigidity is given to the elastic ring located on a side of the convexly curved surface with a smaller radius of curvature.

4. A tire/wheel assembly in which a run-flat support member is disposed in a cavity of a pneumatic tire fitted to a rim of a wheel, the run-flat support member including a circular shell, an outer circumferential side of which is a support surface and an inner circumferential side of which is opened to have two leg portions, and left and right elastic rings which support the two leg portions on the rim, wherein the elastic rings have different rigidities from each other so that the elastic ring receiving a larger load during run-flat traveling has a higher rigidity, and wherein the rigidity of the elastic ring having the higher rigidity is 10 to 100% higher than that of the other elastic ring.

5. A vehicle including a tire/wheel assembly in which a run-flat support member is disposed in a cavity of a pneumatic tire fitted to a rim of a wheel, the run-flat support member including a circular shell, an outer circumferential side of which is a support surface and an inner circumferential side of which is opened to have two leg portions, and left and right elastic rings which support the two leg portions on the rim, wherein the elastic rings have different rigidities from each other so that the elastic ring receiving a larger load during run-flat traveling has a higher rigidity, and wherein, among the left and right elastic rings, the elastic ring on an outer side of the vehicle has a higher rigidity than that of the elastic ring on an inner side of the vehicle.

6. The vehicle including a tire/wheel assembly according to claim 5, wherein the support surface of the circular shell has at least two convexly curved surfaces with substantially the same radius of curvature.

* * * * *